United States Patent [19]

Mizunuma et al.

[11] Patent Number: 4,622,603

[45] Date of Patent: Nov. 11, 1986

[54] HEAD POSITIONING SYSTEM FOR MAGNETIC RECORDING/PLAYBACK APPARATUS

[75] Inventors: Sinji Mizunuma; Masayoshi Sunada, both of Hitachi; Shigemitsu Higuchi, Fujisawa, all of Japan

[73] Assignee: Hitachi, Ltd., Tokyo, Japan

[21] Appl. No.: 658,299

[22] Filed: Oct. 5, 1984

[30] Foreign Application Priority Data

| Oct. 7, 1983 | [JP] | Japan | 58-186986 |
| Oct. 7, 1983 | [JP] | Japan | 58-186987 |
| Oct. 18, 1983 | [JP] | Japan | 58-193553 |
| Mar. 16, 1984 | [JP] | Japan | 59-49104 |

[51] Int. Cl.$^4$ ............................................. G11B 5/55
[52] U.S. Cl. ................................................... 360/78
[58] Field of Search ................................. 360/77, 78

[56] References Cited

U.S. PATENT DOCUMENTS 4,499,510  2/1985  Harding et al. .................. 360/77

*Primary Examiner*—George G. Stellar
*Attorney, Agent, or Firm*—Antonelli, Terry & Wands

[57] ABSTRACT

A magnetic storage disk tracking system employing a stepping motor is operable to compensate the tracking error within a certain expected range caused by the hysteretic movement of the motor. The system incorporates means for recognizing the track to which the magnetic head is positioned and memory means in which is stored data for compensating the positioning error depending on each track. The stepping motor is controlled through the excitation voltage of each winding under modulation in terms of the magnitude or duty cycle in compliance with the stored data.

4 Claims, 18 Drawing Figures

FIG. 7
| SIGNAL STATES AT (D2, D1) | MOTOR CURRENT DIRECTION AND INTERNAL FLUX DIRECTION |
|---|---|
| (0,0) | 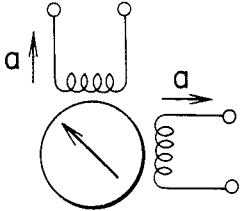 |
| (0,1) | 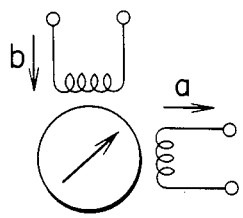 |
| (1,1) | 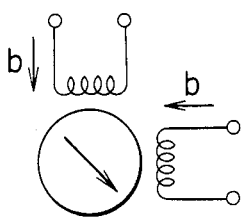 |
| (1,0) | 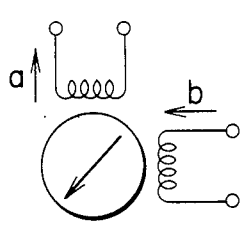 |

HEAD POSITIONING SYSTEM FOR MAGNETIC RECORDING/PLAYBACK APPARATUS

BACKGROUND OF THE INVENTION

The present invention relates to a head positioning system for a magnetic recording/playback apparatus and, particularly, to a head positioning system using a stepping motor and intended to achieve enhanced positioning accuracy.

In the conventional magnetic recording/playback unit mounting detachable magnetic disk such as a floppy disk, the magnetic head is required to have a positioning accuracy within a certain tolerance in order to retain the compatibility with other units. The tolerance, which varies depending on the number of tracks in unit length (track density) and the configuration and dimensions of the magnetic head, has a value substantially equal to the tunnel erasure gap width when a head of the tunnel erasure type having guard bands on both sides of data is used. Accordingly, as the track density increases, higher head positioning accuracy is required.

FIG. 1 is a perspective view showing briefly as an example the conventional head positioning mechanism employed widely in floppy disk drive units. The arrangement shown in the figure includes a stepping motor 1, a pulley 2 press-fitted on the drive shaft of the stepping motor, a steel belt 3, a rail 4 affixed on the chassis (not shown) of the floppy disk drive unit, a carriage 5, a head arm 6, an upper magnetic head 7, a lower magnetic head 8, a chuck 9 for mounting a magnetic recording medium, i.e., floppy disk, (not shown), and a reference track sensor 10.

The head positioning mechanism arranged as mentioned above operates as follows. First, the stepping motor 1 affixed on the chassis rotates incrementally in response to the control signal so that the pulley 2 is rotated incrementally. The rotation of the pulley 2 causes the carriage 5 to move linearly along the rail 4 by being driven by the steel belt 3. Namely, the stepping motor 1 rotates in increments of a certain angle, and accordingly the carriage 5 moves linearly in increments of a certain distance. Accordingly, the upper and lower magnetic heads 7 and 8 mounted on the head arm 6 which is affixed on the carriage 5 are moved linearly in increments of the unit distance. By setting the unit distance equal to the track pitch (the reciprocal of the track density), the upper and lower magnetic heads 7 and 8 are positioned to any track position.

The reference track position sensor 10 detects the edge of the carriage 5 to indicate that the heads 7 and 8 have reached the reference track position (generally, the position of the outermost track).

The positioning error of the magnetic recording/playback apparatus using such a head positioning system as described above is caused by: (1) indexing error of the stepping motor (generally, around ±3% of a step), (2) error of the pulley diameter, (3) error of attachment to the chassis, (4) chucking error of the magnetic disk, (5) expansion or contraction of the magnetic disk due to a thermal and humid environment, and (6) misalignment of the upper and lower heads. The total amount of these errors is appreciably large in the currently prevailing magnetic recording/playback apparatus, and the restriction on the aforementioned tunnel erasure width hampers the realization of a much increased track density.

Next, the indexing error of the stepping motor will be described in more detail. FIG. 2 is a graph showing the stepping motor output torque plotted against the rotational angle, and FIG. 3 is a chart used to explain the indexing error of the stepping motor. In both figures, the curve and line indicated by M represent the output torque and error when the motor rotates clockwise, while the curve and line indicated by N represent those of counterclockwise rotation.

The stepping motor stops at a point of zero output torque, but once the motor is loaded it behaves with hysteretic output torque characteristics due to the frictional torque. On this account, the motor stops at different positions depending on the rotational direction as shown in FIG. 2, resulting in an angular error as shown in FIG. 3 that varies at each track.

Next, the angular error of the stepping motor caused by the switching of drive voltages during the step movement and quiescent state of the motor will be described in detail. Generally, a stepping motor used in a floppy disk drive unit is energized by a higher voltage (12 volts in general) as shown in FIG. 4 during a track traversing movement in order to achieve the accurate and fast positioning of the head. Then, upon expiration of a certain interval ($t_1$) when head positioning has been completed, the motor is kept energized by a lower voltage (5 volts in general).

FIG. 5 is a chart used to explain the angular error of the stepping motor. In the figure, the dashed line indicated by M represents the angular error during the step movement, while the solid line indicated by N represents the angular error after the step movement has completed. Different angular errors result for both moving states due to unbalanced currents flowing in the excitation windings at the moment of switching the drive voltage, and yet these angular errors vary at each track.

SUMMARY OF THE INVENTION

An object of the present invention is to provide a head positioning system for a magnetic recording/playback apparatus using a stepping motor for the head positioning operation with the contemplation of enhanced head positioning accuracy and increased recording density.

The present invention resides in a head positioning system for a magnetic recording/playback apparatus, at least of a type using a stepping motor for the head positioning operation, the system comprising means for counting tracks and nonvolatile memory means in which data for correcting the head positioning error is stored in advance so that the stepping motor is controlled in compliance with the stored corrective data.

BRIEF DESCRIPTION OF THE DRAWINGS

FIG. 7 is a set of illustrations showing the principle of operation of the stepping motor.

DESCRIPTION OF THE PREFERRED EMBODIMENTS

Embodiments of the present invention will now be described with reference to the drawings.

Figure 1:
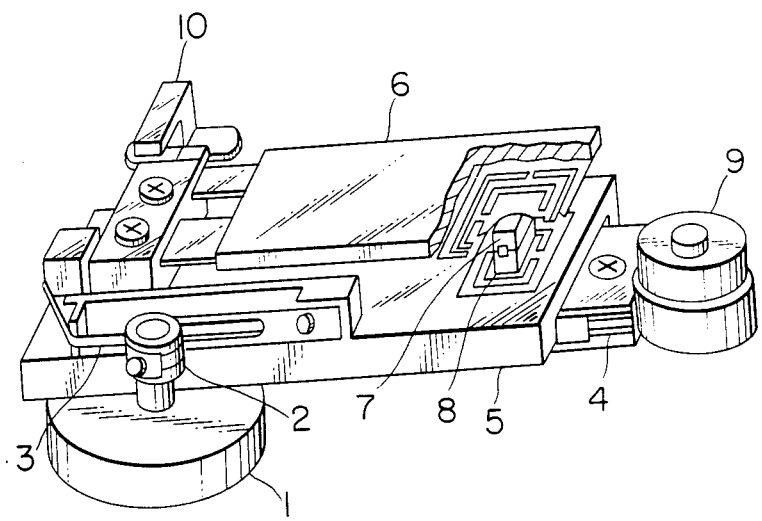
FIG. 1 is a perspective view showing in brief the conventional head positioning mechanism.
Figure 6:
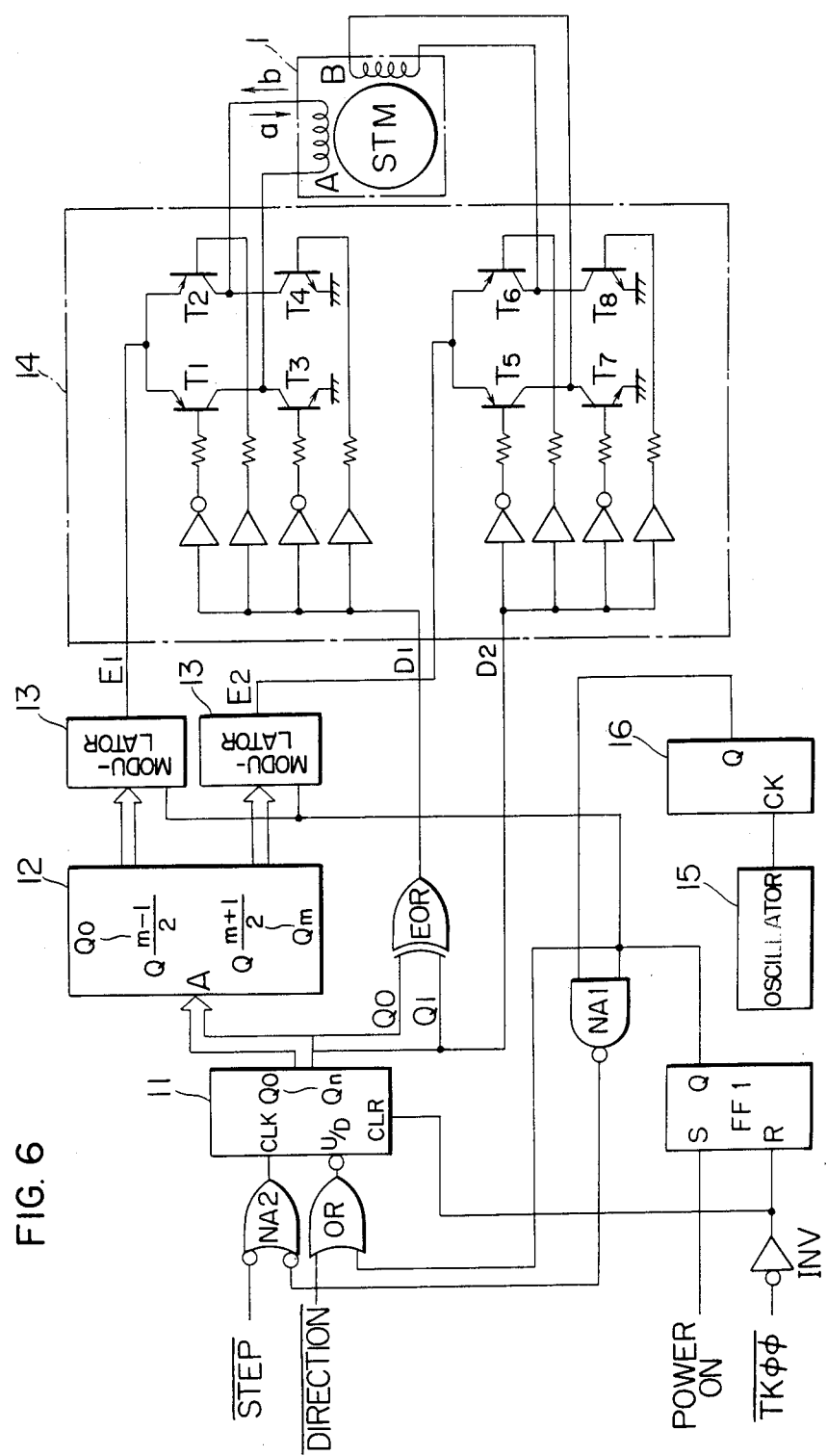
FIG. 6 is a schematic diagram of the head positioning system embodying the present invention.

FIG. 6 shows the arrangement of the head positioning system for a magnetic recording/playback apparatus embodying the present invention, and this circuit is additionally provided for the stepping motor 1 shown in FIG. 1. The system arrangement shown in FIG. 6 includes a stepping motor 1, a track counter 11, a PROM (programmable read-only memory) 12 for storing data, modulators 13, a stepping motor driver 14, an oscillator 15, and a counter 16.

Referring first to the input signals, $\overline{\text{STEP}}$ is a signal for moving the magnetic head by one track pitch and is sent from the host controller. In this embodiment, the stepping motor 1 rotates by a certain angle in response to each falling edge of the $\overline{\text{STEP}}$ signal. Signal $\overline{\text{DIRECTION}}$ is also sent from the host controller for specifying the rotational direction of the stepping motor 1, with the signal at a low level directing the magnetic head to move toward the inner track of the magnetic disk. Signal $\overline{\text{TK00}}$ is the output of the reference track position sensor 10 in FIG. 1, and it goes low when the upper and lower magnetic heads 7 and 8 have reached the reference track position. Signal POWER ON goes high when the power voltage to the system has built up.

Next, the operation of each circuit section will be described. The track counter 11 is cleared after the upper and lower heads 7 and 8 have been moved to the reference track position (the outermost track on the magnetic disk, and tracks are numbered inwardly starting with 0 assigned to the reference track) following the power-on procedure. Normally, the track counter 11 operates to up-count or down-count in response to the $\overline{\text{STEP}}$ and $\overline{\text{DIRECTION}}$ signals provided by the host controller, thereby indicating the track number corresponding to the head position.

The low-order two bits $Q_0$ and $Q_1$ at the output of the track counter 11 are fed through an EOR gate to the $D_1$ terminal of the stepping motor driver 14, and the output $Q_1$ is further fed directly to the $D_2$ terminal of the driver 14. Accordingly, the stepping motor driver 14 receives at its $D_1$ and $D_2$ terminals the signal states $[D_2, D_1]$ which vary cyclically when the track counter 11 operates to up-count, as: $[0,0] \rightarrow [0,1] \rightarrow [1,1] \rightarrow [1,0] \rightarrow [0,0]$, and so on. When the track counter operates to down-count, the signal states $[D_2, D_1]$ vary cyclically as: $[0,0] \rightarrow [1,0] \rightarrow [1,1] \rightarrow [0,1] \rightarrow [0,0]$, and so on.

The stepping motor driver 14 is available, for example, as integrated circuit module HA13421P manufactured by Hitachi Ltd., Japan, and FIG. 7 shows the principle of operation of the stepping motor driven by this driver.

When the $D_1$ terminal is low, causing switching transistors $T_2$ and $T_3$ to be conductive, the input voltage at the input terminal $E_1$ produces a current flowing in the A-phase winding of the stepping motor 1 in the direction shown by a, while when the $D_1$ terminal is high, causing switching transistors $T_1$ and $T_4$ to be conductive, the current flows in the winding in the direction shown by b. The same operation takes place using switching transistors $T_5$-$T_8$ to produce a current flowing in the B-phase winding of the stepping motor in proportion to the input voltage at the input terminal $E_2$. Namely, the voltages at the input terminals $E_1$ and $E_2$ are applied, with their polarities controlled by the input signals at the $D_1$ and $D_2$ terminals, to the A-phase and B-phase windings of the stepping motor 1.

In this embodiment, a commercially-available hybrid stepping motor is used as the stepping motor 1, and the cyclical changes of the signals at the $D_1$ and $D_2$ terminals caused by up-counting or down-counting of the track counter 11 as described above create a rotating magnetic field in the stepping motor 1 as shown in FIG. 7, resulting in the rotation of the rotor of the stepping motor 1. In response to each change of signal states at $D_1$ and $D_2$ terminals, the magnetic head is moved by one track pitch interval.

Figure 8:
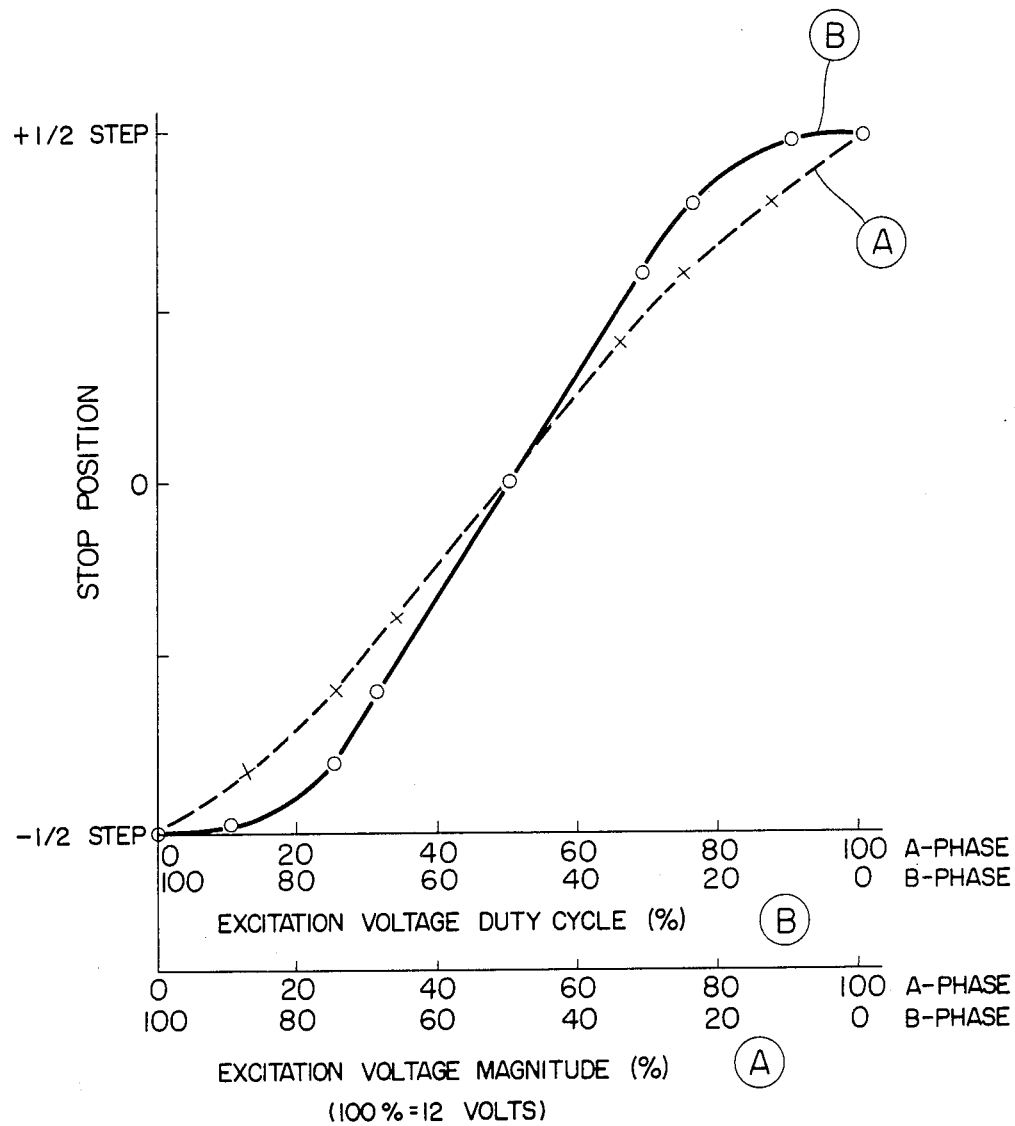
FIG. 8 is a diagram used to explain the method of controlling the stepping motor.

Next, the compensation for the tracking error will be described. FIG. 8 is a graph based on the actual measurement, showing the variation in the stop position of the stepping motor achieved by controlling the drive voltage across the winding. On the graph, the curve Ⓐ respresents the stop position of the stepping motor plotted against the percent magnitude of voltages applied to the A-phase and B-phase windings. It will be appreciated from the graph that the stop position can be controlled within the range of $\pm\frac{1}{2}$ step centered by the stop position attained by the balanced voltage application through the control of voltages applied to both windings, thence the magnetic head can be positioned at arbitrary positions in this range. The curve Ⓑ on the graph shows the stepping motor stop position achieved by changing the duty cycle of the PWM (pulse width modulation) voltages applied to the A-phase and B-phase windings, and it can be seen that the stop position can be controlled similarly to the case of changing the voltage of the windings.

Figure 9:
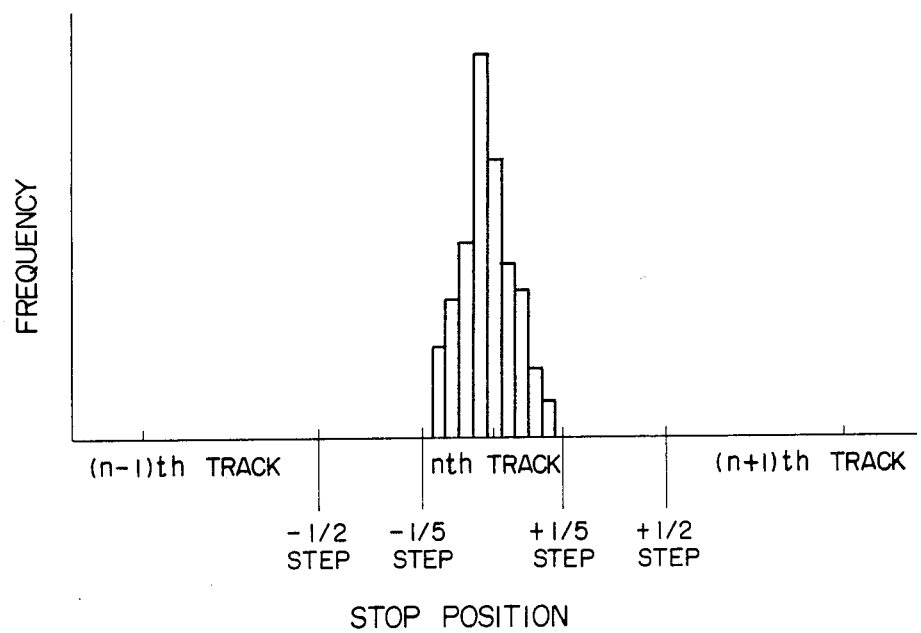
FIG. 9 is a frequency distribution graph of the head positioning error.
Figure 10:
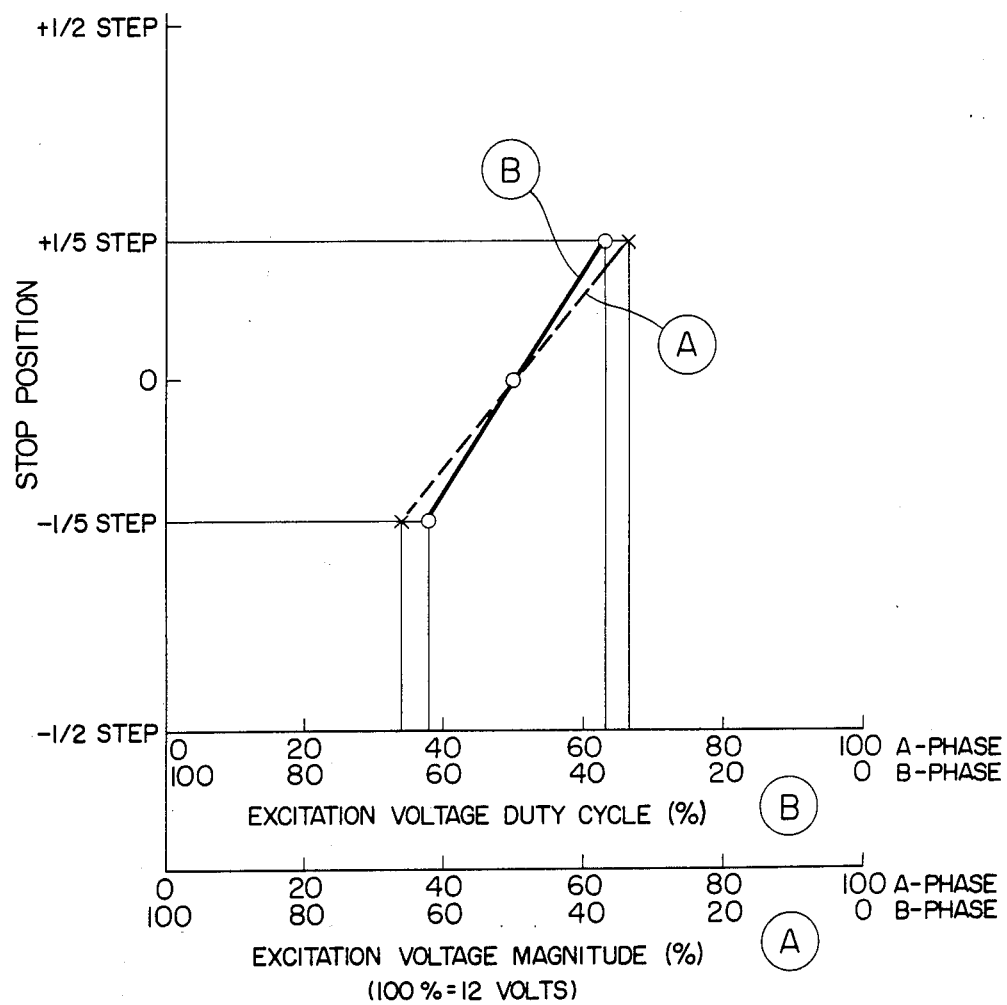
FIG. 10 is a diagram relating the voltages applied to the A-phase and B-phase windings necessary to correct the head positioning error within 1/5 step of rotation.

However, the actual head positioning error does not distribute evenly in the entire range of $\pm\frac{1}{2}$ step with respect to the center of a track. FIG. 9 shows the frequency distribution of the head stop position based on the actual measurement, and it is indicated that the actual head positioning error ranges within $\pm 1/5$ step. Accordingly, it is sufficient to control the voltages applied to the A-phase and B-phase windings to the extent of compensating the tracking error within 1/5 step, as shown in FIG. 10. It is more efficient to vary the voltage (curve Ⓐ) or duty cycle (curve Ⓑ) for modifying the stop position within $\pm 1/5$ step than providing the ability to cover the range of $\pm\frac{1}{2}$ step. If the range of ±1/5 step is controlled in the same number of divisions as of the ±½ step range (e.g., 64 divisions or 128 divisions), the head positioning error can be corrected more precisely.

The compensation for the tracking error is carried out as follows. Initially, after the tracking mechanism has been assembled, measurement is conducted to determine the voltage (or duty cycle) to be applied to the A-phase and B-phase windings for nullifying the positioning error for each track. (It is a known technique to measure the disk tracking error by prerecording a special error measurement signal on the disk and retrieving the signal by the magnetic head.) The determined values of voltage or duty cycle for each track of each specific disk drive unit are formatted in an appropriate data form and stored in the PROM 12 shown in FIG. 6. In operating the disk drive unit, the signal for nullifying the positioning error of each track is read out from the PROM 12 in correspondence to the output of the track counter 11, and the signal operates on the stepping motor driver 14 to stop the stepping motor 1 at a point of no positioning error.

Next, two particular examples of the modulators 13 shown in FIG. 6 will be explained with reference to FIGS. 11 and 12. The arrangement of FIG. 11 uses D/A (digital to analog) converters 17, and they are located between the output of the PROM 12 and the input of the stepping motor driver 14. Control data read out of the PROM 12 is converted into analog voltages by the respective D/A converters 17, and driving transistors $T_9$ and $T_{10}$ receiving these voltages supply d.c. voltages to the input terminals $E_1$ and $E_2$ of the stepping motor driver 14. This arrangement is suited for voltage control shown by Ⓐ in FIG. 8.

Figure 12:
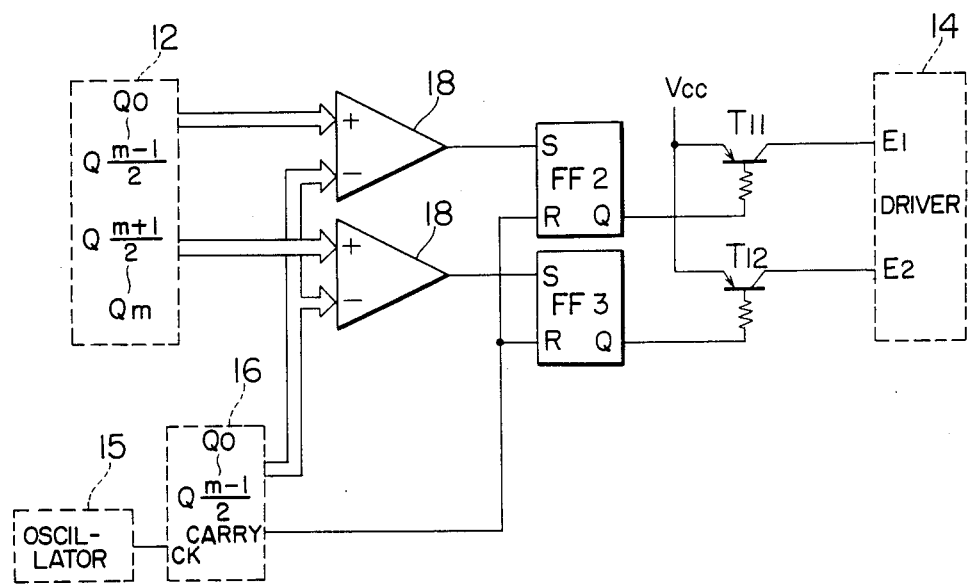

FIG. 12 shows another arrangement, and it is operable to vary the duty cycle of the application voltage. The arrangement includes a digital comparator 18 located after the PROM 12 and before the stepping motor driver 14, and the oscillator 15 and the counter 16 which distributes bit outputs derived from the oscillation pulses are shared with the circuit of FIG. 2. The counter 16 provides the carry signal at a certain interval of count pulses, and it is used to reset flip-flops FF2 and FF3. The digital comparators 18 compare the outputs of PROM 12 with the output of counter 16, and set the respective flip-flops FF2 and FF3 when both outputs are consistent. Accordingly, the flop-flops FF2 and FF3 produce alternating signals having duty cycles determined by the contents of the PROM 12, and the signals control the conduction of the driving transistors $T_{11}$ and $T_{12}$. Then, the stepping motor driver 14 receives at its input terminals $E_1$ and $E_2$ the voltage Vcc with duty cycles in compliance with data stored in the PROM 14. This system assures high efficiency since the driving transistor $T_{11}$ and $T_{12}$ operate in saturation mode.

Figure 2:
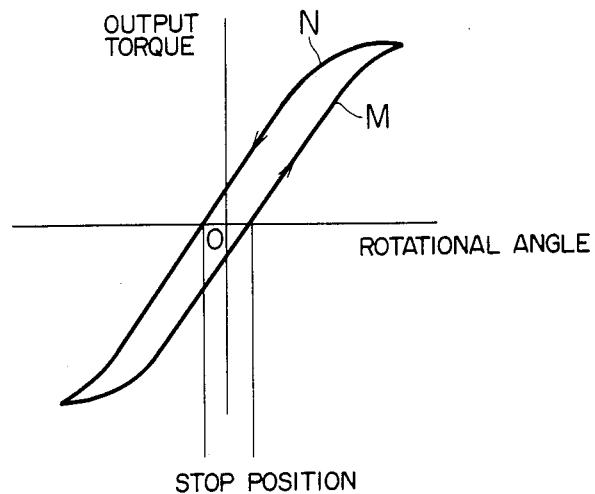
FIG. 2 is a graph relating the output torque of the stepping motor with its rotational angle.
Figure 3:
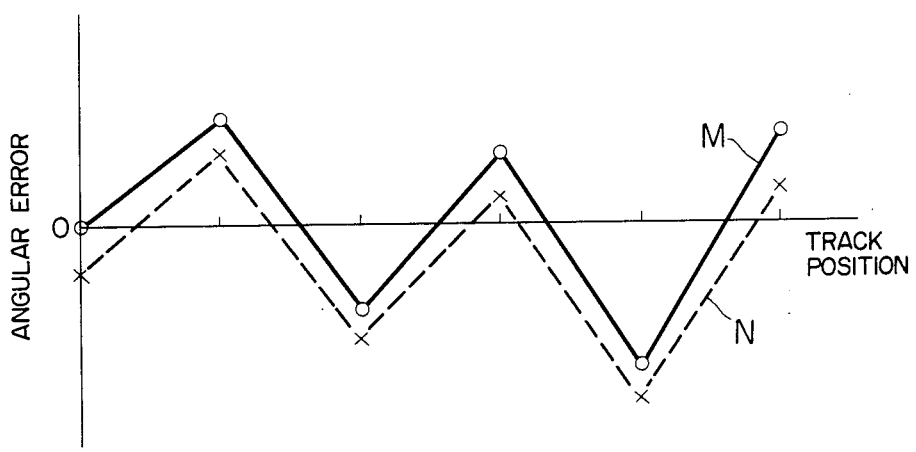
FIG. 3 is a chart explaining the angular error or the stepping motor.
Figure 13:
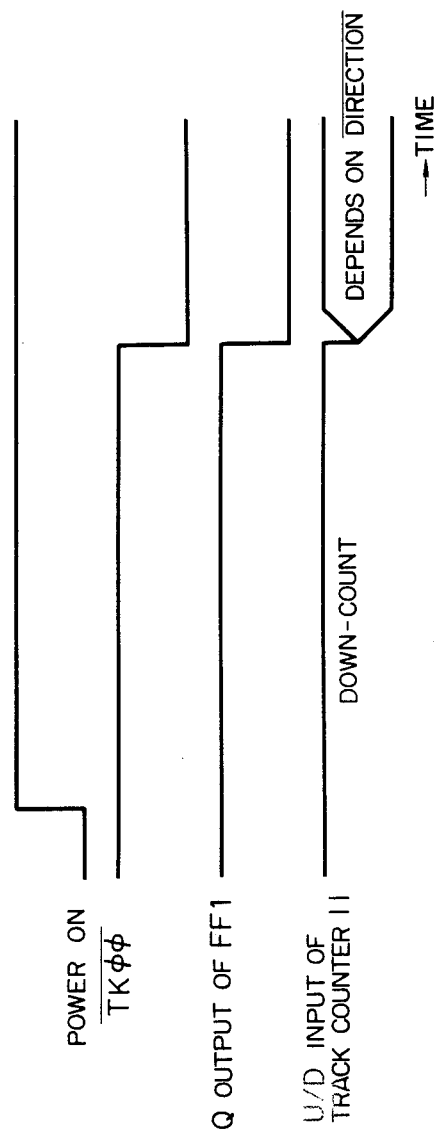
FIG. 13 is a timing chart showing the operation at a power build-up phase.

Returning to the circuit of FIG. 6, if the contents of the track counter 11 is not coincident with the actual track position, legitimate correction data is not provided by the PROM 12, and on this account the track counter 11 needs to be reset when power is turned on. FIG. 13 is a timing chart showing the power-on sequence of the system. In response to thr rising POWER ON signal, the flop-flop FF1 in FIG. 2 is set and the track counter 11 is placed in down-count mode. Output pulses from the oscillator 15 are counted down by the counter 16, and fed through logical gates NA1 and NA2 to the CLK terminal of the track counter 11. At this time, the $\overline{STEP}$ signal is kept high by a gate not shown. The counter 16 is set up to provide an output period of a few milliseconds in general. Accordingly, the track counter 11 downcounts at this interval, while at the same time the stepping motor 1 rotates to move the magnetic head toward the reference track. When the magnetic head has reached the reference track position, the reference track position sensor 10 provides a low $\overline{TK00}$ signal, which resets the flip-flop FF1 and at the same time resets the track counter 11. Thus, the contents of track counter 11 becomes consistent with the actual track position, and, thereafter, the upper and lower heads 7 and 8 are positioned with much less positioning error through the foregoing corrective operation.

Figure 14:
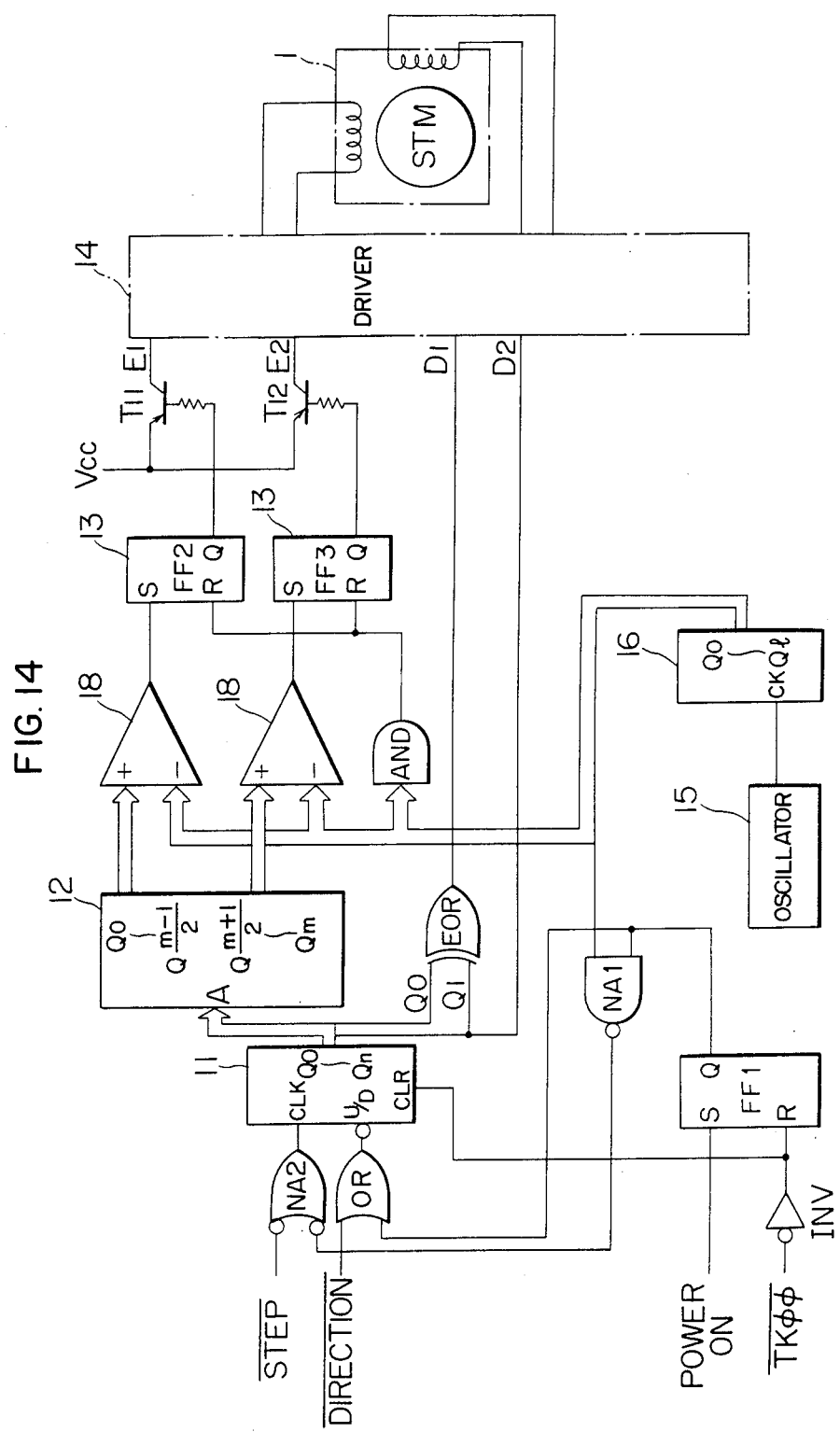
FIG. 14 is a schematic diagram of the head positioning system according to another embodiment of the invention.

FIG. 14 is a schematic diagram showing another embodiment of the present invention. In the figure, common reference symbols are given to circuit components that are equivalent to those shown in FIGS. 6 and 12. This embodiment is intended to improve the previous embodiment which needs a large number of output bits $Q_0$–$Q_m$ of the PROM 12 when the tracking error is compensated by the PWM technique in the range of ±1/5 step with the same number of divisions as used in the range of ±½ step.

The new arrangement operates as follows. Output pulses from the oscillator 15 are counted down by the counter 16. The digital comparator 18 compares the binary output of the counter 16 with the output of the PROM 12, and sets the flip-flops FF2 and FF3 when both outputs are equal. When the counter 16 provides the output of 1s for all bits, that is detected by the AND gate shown, the flip-flops FF2 and FF3 are reset simultaneously.

Since the range of correction needed for the head positioning error is ±1/5 step, as can be seen from FIGS. 9 and 10, the counter 16 is set up to provide the output to the AND gate to reset the flip-flops FF2 and FF3 when the duty cycle enough to deflect the stepping motor 1 by ±1/5 step (i.e., 38% duty cycle as estimated from FIG. 10) is reached.

Figure 15:
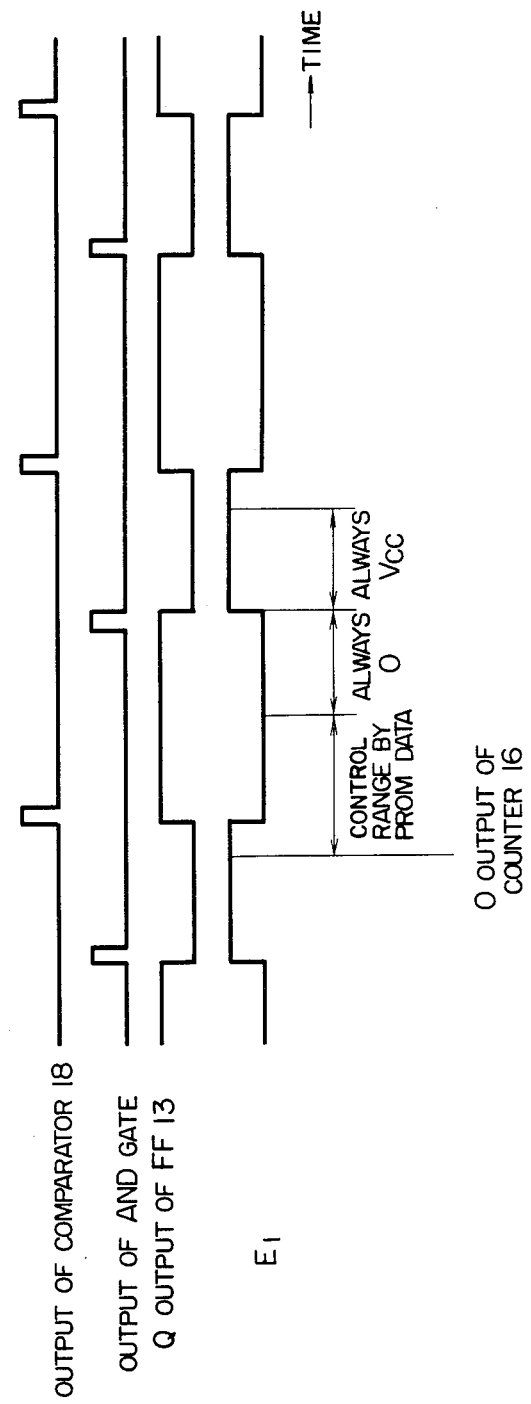
FIG. 15 is a timing chart showing the operation of the system shown in FIG. 14.

Then, the flip-flops FF2 and FF3 produce at their Q terminal the outputs with a duty cycle in compliance with the outputs of the PROM 12 and the AND gate, and these signals control the conduction of the driving transistors $T_{11}$ and $T_{12}$. FIG. 15 shows the timing of the above operation. The remaining part of the operation is exactly identical to the case of the previous embodiment shown in FIG. 6.

The foregoing embodiments of the present invention appreciably improve the positioning accuracy of the open-loop head positioning system using a stepping motor, allowing a recording density twice that of the conventional system.

Although the foregoing embodiments are devoted to the floppy disk tracking system, the present invention is not limited to this, but it is applicable extensively to open loop positioning control systems using stepping motors.

For the duty cycle modulator shown in FIG. 12, it is possible to implement the complementary operation for the signals at input terminals $E_1$ and $E_2$, and in this case the lower digital comparator 18 and flip-flop FF3 can be eliminated.

Furthermore, the PROM can be replaced with any nonvolatile memory means including erasable ROM and masked ROM, or battery backed-up RAM (random access memory).

Figure 16:
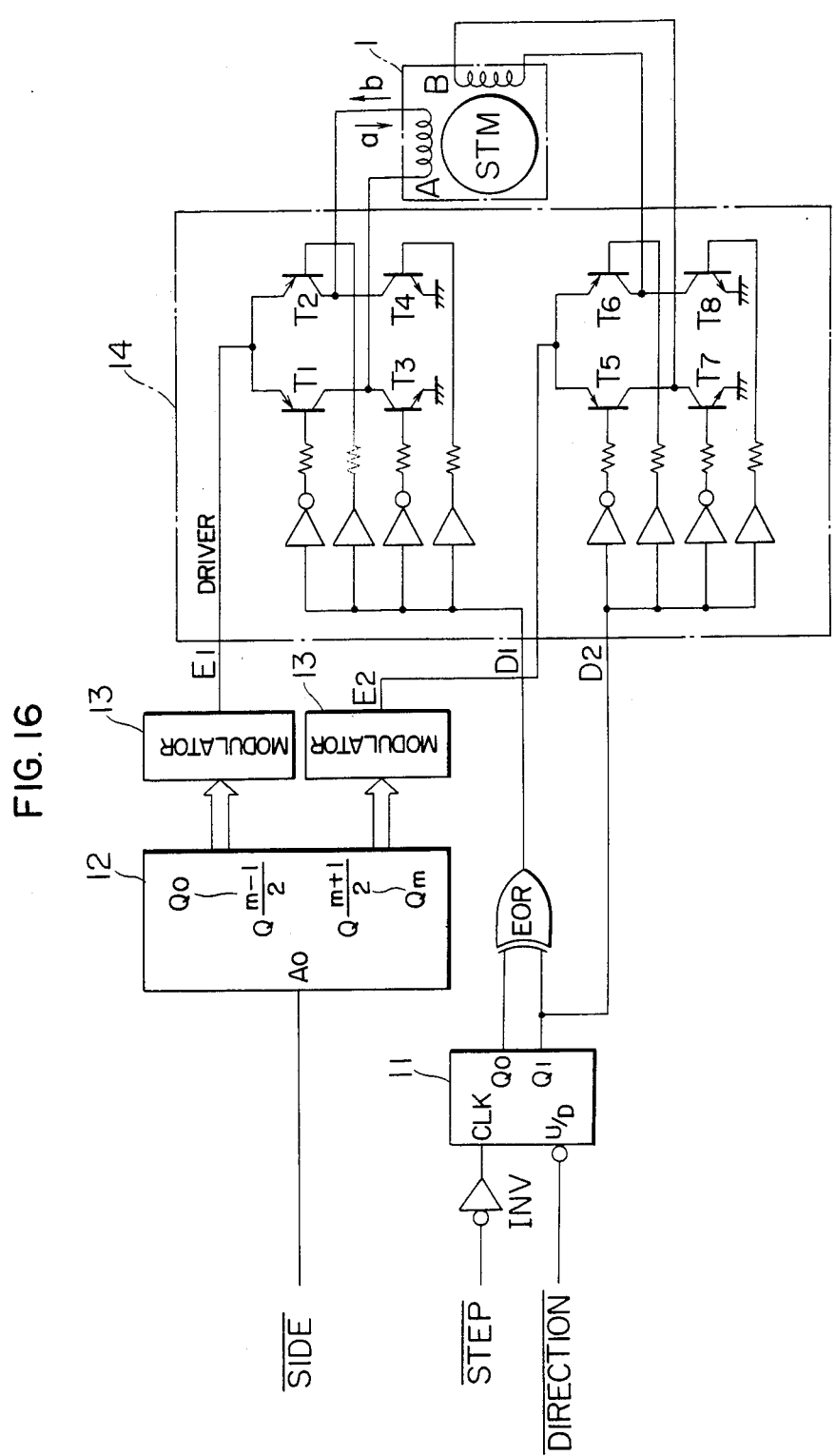
FIGS. 16 and 17 are diagrams used to explain still another embodiment of the invention.

FIG. 16 is a schematic diagram showing still another embodiment of the present invention. In the figure, common reference symbols are given to the circuit components that are equivalent to those shown in FIG. 6.

Signal $\overline{SIDE}$ is the head switching signal, selecting the upper head 7 when it is low, or selecting the lower head 8 when it is high. The track counter 11 operates to up-count or down-count in response to the $\overline{STEP}$ and $\overline{DIRECTION}$ signals provided by the host controller, thereby indicating the track number. The track counter 11 provides its bit outputs $Q_0$ and $Q_1$ through the EOR gate to the $D_1$ terminal of the stepping motor driver 14. The bit output $Q_1$ is also fed directly to the $D_2$ terminal of the driver 14. Accordingly, the stepping motor driver 14 receives at its $D_1$ and $D_2$ terminals the signal states [$D_1$, $D_2$] which vary cyclically when the track counter 11 operates to up-count, as: [0,0]→[0,1]→[1,1]→[1,0]→[0,0], and so on. When the track counter 11 operates to down-count, the signal states [$D_1$, $D_2$] vary cyclically as: [0,0]→[1,0]→[1,1]→[0,1]→[0,0], and so on.

The compensation for the tracking error is carried out as follows. Initially, after the tracking mechanism has been assembled, the misalignment of the upper and lower heads 7 and 8 is measured using a calibration disk (a special signal is prerecorded on the disk and the positional error is measured by reading the recorded signal by the magnetic head). The duty cycle or magnitude of voltages applied to the A-phase and B-phase windings in proportion to the measured displacement is determined on the graph of FIG. 8, and data carrying this information is stored in the PROM 12.

In operating the disk drive unit, data for compensating the displacement of the upper or lower head is read out of the PROM 12 depending on the $\overline{SIDE}$ signal, so that the rotational angle of the stepping motor 1 is modified by the amount indicated, whereby each of the upper and lower heads 7 and 8 is positioned right on the track.

Figure 11:
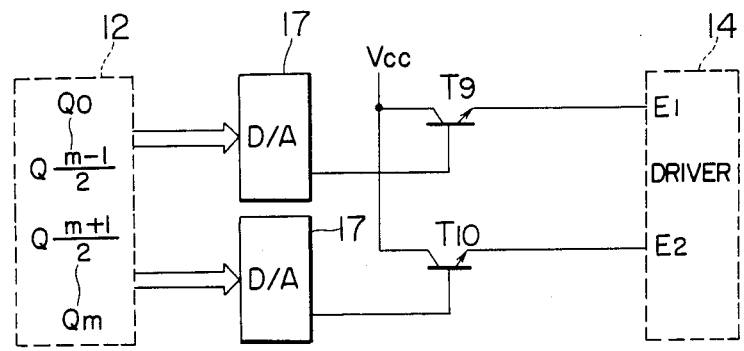
FIGS. 11 and 12 are schematic diagrams of separate modulators.

Two particular arrangements of the modulator 13 shown in FIG. 16 are shown in FIGS. 11 and 12.

The foregoing embodiment appreciably improves the positioning accuracy of the upper and lower magnetic heads of the open-loop head positioning system using a stepping motor through the compensation for the misalignment of the upper and lower heads.

Figure 4:
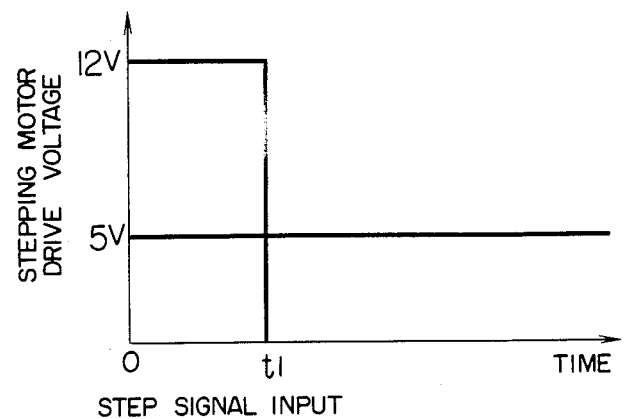
FIG. 4 is a diagram showing the stepping motor drive voltage.
Figure 5:
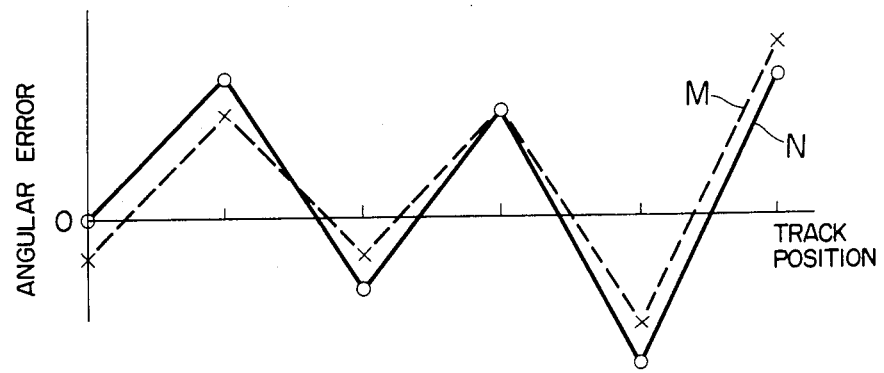
FIG. 5 is a chart explaining the angular error of the stepping motor.
Figure 17:
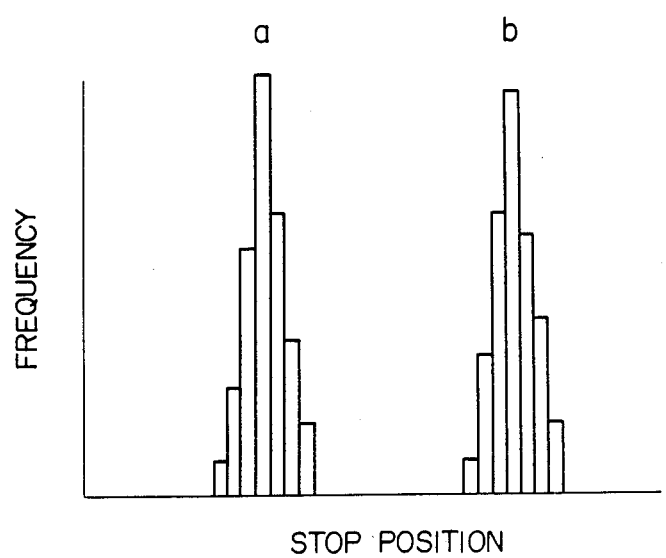

Next, a further embodiment of the present invention will be described. Data stored in the PROM 12 is determined depending on the rotational direction of the stepping motor 1 as follows. FIG. 17 shows the frequency distribution of the stop position of the stepping motor 1 at one track, distribution a showing the case of the clockwise rotation of the motor, while distribution b being the case of the counterclockwise rotation. As can be seen from the graph, the stop position concentrates within a certain variation range in each case. By the provision of data representing the voltage or duty cycle in the PROM 12 of FIG. 4 such that the center values of the cases a and b have no positioning error, the tracking error can be minimized.

Figure 18:
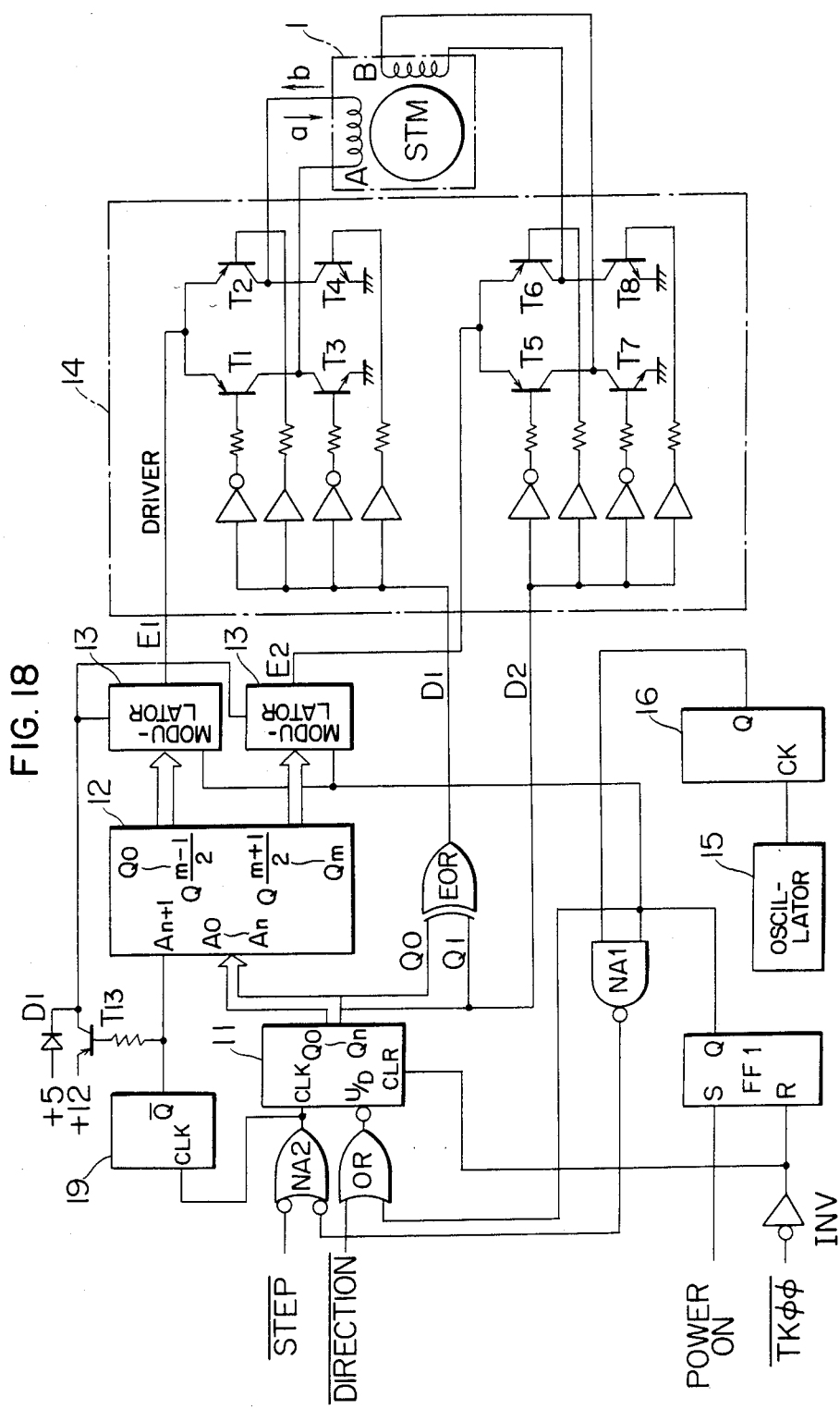
FIG. 18 is a circuit diagram of still another embodiment.

Finally, still another embodiment of the present invention will be described with reference to FIG. 18. This arrangement differs from that of FIG. 4 in that a monostable multivibrator 19 and a switching transistor $T_{13}$ are additionally provided. The basic operation is the same as of the embodiment shown in FIG. 6, except that different excitation voltage is applied to the winding of the stepping motor during the step movement and after the movement. When the $\overline{Q}$ output of the monostable multivibrator 19 goes low for the specified duration in response to the $\overline{STEP}$ signal or the Q output of the counter 16, the switching transistor $T_{13}$ becomes conductive to supply +12 volts through the modulators 13 to the windings of the stepping motor 1. On expiration of the specified duration, the $\overline{Q}$ output of the monostable multivibrator 19 goes high, causing the switching transistor $T_{13}$ to be cut off, and +5 volts is applied through a diode $D_1$ to the windings. Since time needed to complete the step movement is unique for the given head positioning mechanism shown in FIG. 1, the active output of the monostable multivibrator 19 can be fixed. On this account, the magnetic heads 7 and 8 can be positioned with less tracking error.

According to the present invention, the head positioning accuracy can effectively be improved without the replacement with a new head positioning system, but by merely adding some electronic components to the conventional system.

We claim:

1. A head positioning system for a magnetic recording/reproducing apparatus for recording/reproducing information on/from a recording medium by at least one magnetic head, said system employing a stepping motor for positioning of said magnetic head, said system comprising:

means for changing over driving voltages applied to said stepping motor during a step movement thereof and after said step movement thereof, respectively;

means for counting tracks of said recording medium with the movement of said magnetic head; and non-volatile memory means for previously storing two types of data for compensating head positioning errors for each track, one type of data being data for compensating head positioning errors during the step movement and the other type of data being data for compensating head positioning errors after said step movement, said two types of data being read out in accordance with the content of said counting means for each step movement and after said step movement to thereby control said stepping motor in accordance with the read out data so as to accurately position said magnetic head for each track.

2. A head positioning system according to claim 1, wherein said data stored in said non-volatile memory means represents data for an expected range of positioning error with respect to the center of each track.

3. A head positioning system according to claim 2, further comprising means for controlling the operation of said stepping motor by controlling an amplitude of a driving voltage applied to windings of said stepping motor.

4. A head positioning system according to claim 2, further comprising means for controlling the operation of said stepping motor by controlling a duty ratio of a driving voltage applied to windings of said stepping motor.

* * * * *